(12) United States Patent
Mulvey et al.

(10) Patent No.: US 6,605,346 B2
(45) Date of Patent: Aug. 12, 2003

(54) LABEL WRAP

(75) Inventors: Patricia M. Mulvey, Neenah, WI (US); Ronald G. Hagen, Larsen, WI (US)

(73) Assignee: Menasha Corporation, Neenah, WI (US)

(*) Notice: Subject to any disclaimer, the term of this patent is extended or adjusted under 35 U.S.C. 154(b) by 0 days.

(21) Appl. No.: 09/842,740

(22) Filed: Apr. 25, 2001

(65) Prior Publication Data

US 2001/0031354 A1 Oct. 18, 2001

Related U.S. Application Data

(60) Provisional application No. 60/201,455, filed on May 3, 2000, and provisional application No. 60/200,101, filed on Apr. 27, 2000.

(51) Int. Cl.[7] ................................................ B32B 7/12
(52) U.S. Cl. ........................ 428/354; 428/343; 428/194; 428/198
(58) Field of Search ................. 428/343, 354, 428/194, 198

(56) References Cited

U.S. PATENT DOCUMENTS

| | | | | |
|---|---|---|---|---|
| 4,479,838 A | * | 10/1984 | Dunsirn et al. | 156/247 |
| 5,389,415 A | * | 2/1995 | Kaufmann | 428/40 |
| 6,383,593 B1 | * | 5/2002 | Fabel | 428/42.3 |

* cited by examiner

Primary Examiner—Daniel Zirker
(74) Attorney, Agent, or Firm—Quarles & Brady LLP

(57) ABSTRACT

The present invention provides a wrap for a napkin, ice cream cone or similar item made up of at least two plies, including a top sheet and a base sheet, in which the two plies are laminated together releasably. Preferably, the lamination of the two plies is accomplished with a dry residue adhesive such that the adhered together surfaces of the two plies are non-tacky after the top ply is removed from the base ply. Printing may be provided on all four surfaces presented by a wrap of the invention to add value to the wrap, for example to present a game to the user or to present the user with coupons.

9 Claims, 1 Drawing Sheet

LABEL WRAP

CROSS-REFERENCE TO RELATED APPLICATIONS

This application claims the benefit of U.S. provisional application Ser. Nos. 60/201,455, filed May 3, 2000 and 60/200,101, filed Apr. 27, 2000.

STATEMENT CONCERNING FEDERALLY SPONSORED RESEARCH OR DEVELOPMENT

Not applicable.

1. Field of the Invention

This invention relates to labels, and in particular to a laminated label strip for use as a wrap, such as a wrap for a napkin, ice cream cone or similar item.

2. Background of the Invention

Paper or other disposable sheet material wraps are often used in restaurants to hold a paper or cloth napkin wrapped around the silverware at a place setting. Similar wraps are used to wrap around an ice cream cone or other food item for sanitation, increased strength, etc. Such wraps are typically a strip of paper with a cohesive applied to areas at opposite ends of the strip and on opposite sides of the strip, so that when the wrap is wrapped around the napkin, ice cream cone, etc., the two areas of cohesive are brought into contact with one another to hold the wrap shut. As is well known, a cohesive is an adhesive that sticks to itself, but does not stick to most other materials.

Such wraps have typically been a single ply of paper or other sheet material which may or may not bear printing. The present invention aims to take advantage of promotional and entertainment opportunities presented by such a wrap.

SUMMARY OF THE INVENTION

The present invention provides a label wrap which is a strip of sheet material having a first side and a second side opposite from the first side, and a first end and a second end opposite from the first end. The strip is made up of first and second sheets, each having an outward facing side and an inward facing side. The inward facing sides of the first and second sheets are releasably joined by an adhesive and a first area of cohesive is applied to the first side adjacent to the first end of the strip and a second area of cohesive is applied to second side adjacent to the second end of the strip. Thereby, the first and second areas of cohesive can be joined to form a ring.

The label wrap of the present invention can be used to provide a napkin wrap, ice cream cone wrap or other food or non-food related sheet material wrap, wade up of at least two plies, including a top sheet and a base sheet, in which the two plies are laminated together releasably. Preferably, the lamination of the two plies is accomplished with a dry residue adhesive such that the adhered together surfaces of the two plies are non-tacky after the top ply is removed from the base ply. Printing may be provided on all four surfaces. The label wrap, for example, can be used to present a game to the user or to present the user with coupons.

The end areas on opposite sides of the label are coated with the cohesive so that when the label is wrapped around an item, the two cohesive areas can be brought into contact with one another to hold the label wrap closed.

One of the sheets of the label wrap can be divided into first and second parts, with the cohesive coating the outer surface of one of the parts, wherein the first part is not adhered to the first sheet at one corner. Both parts can be releasably adhered to the other sheet so that both parts can be peeled off. Alternatively, the cohesive coated part can be permanently adhered to the other sheet so that only one part of the sheet can be peeled off. In either case, at one corner of the label wrap the first and second sheet are preferably not joined together, thereby providing a pull tab for the user to easily separate the sheets.

The invention thus provides a simple and inexpensive label wrap particularly designed for use as a napkin wrap, ice cream cone wrap, or similar wrap. The label wrap can include printing on both sides of each sheet thereby maximizing space for promotional or other indicia.

These and other objects and advantages of the invention will be apparent from the following detailed description and drawings.

DETAILED DESCRIPTION OF THE PREFERRED EMBODIMENT

Figure 1:
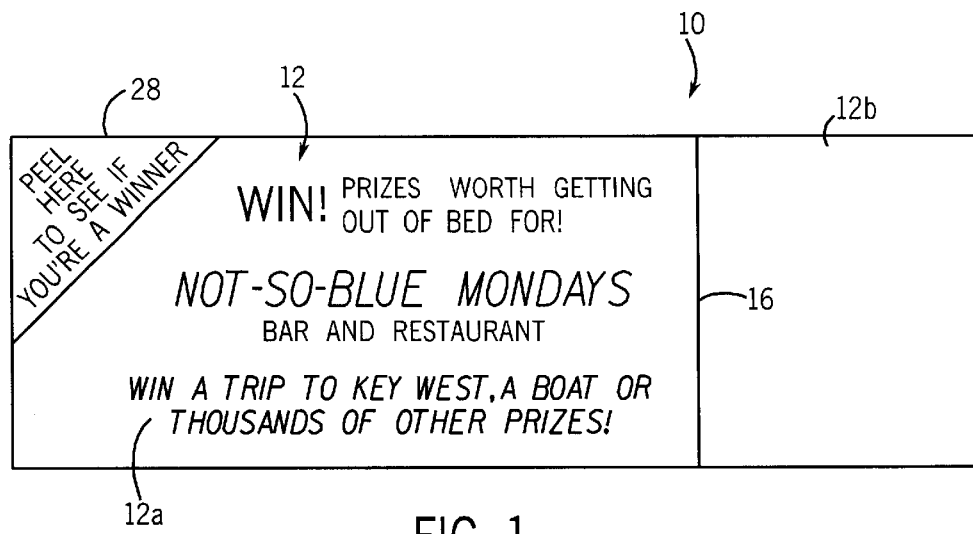
FIG. 1 is a top plan view of a label of the invention.
Figure 2:
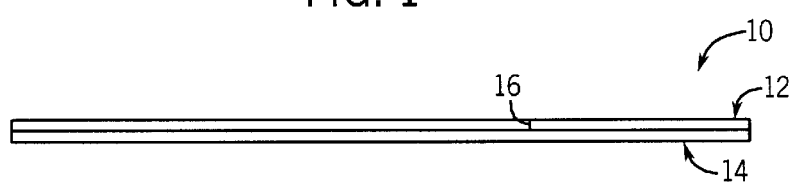
FIG. 2 is a side plan view of the label of FIG. 1.
Figure 3:
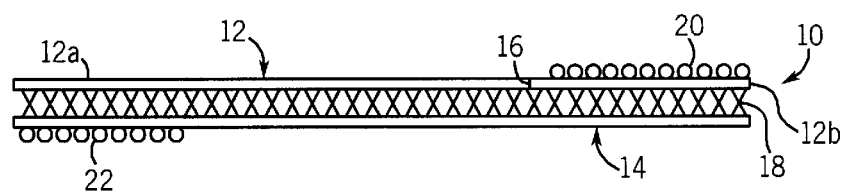
FIG. 3 is a schematic view showing two plies of the label of FIGS. 1 and 2 and different adhesive and cohesive areas.

Referring to FIGS. 1–3, a label 10 of the invention has a top sheet 12 and a base sheet 14. The top sheet 12 is laminated to the base sheet 14 so as to be releasable from the base sheet 14, preferably using a dry residue adhesive so that after the sheets 12 and 14 are separated, their previously adhered respective bottom and top surfaces are non-tacky such that they can not be stuck back together. Preferably, the sheet 12 is adhered to the sheet 14 over the entire area of its rear surface, except at the upper left hand corner as shown in FIG. 1, where it says "Peel here to see if you're a winner". Not adhering this corner provides an easy access tab for a user to lift the sheet 12 from the sheet 14.

In the embodiment of FIGS. 1–3, the sheet 12 is separated into two parts 12a and 12b by a cut line 16, which roughly separates the printed area (part 12a) from the cohesive area (part 12b) on the upper surface of the top sheet 12. Printing as shown on the top surface of part 12a may be provided on that surface, as well as on any of the other three surfaces (the bottom of sheet 12, the top of sheet 14, or the bottom of sheet 14) of the label 10. Such printing may be of a game as shown, or it may include coupons or discounts available to the user or person who unwraps the wrap 10. In any event, a wrap of the invention presents at least four printable surfaces.

As shown in FIG. 3, the adhesive 18 laminating the sheets 12 and 14 together is indicated by X's, and the cohesive areas 20,22 are indicated by O's. As stated above, the adhesive 18 covers substantially the entire area between the sheets 12 and 14, except the upper left hand corner in FIG. 1. The cohesive coated area 20 covers substantially the entire surface area of the upper surface of part 12b, and the cohesive coated area 22 is approximately the same size, although provided on the lower surface of base sheet 14 and at the end opposite from the end that cohesive 20 is provided on. The cohesive coated onto the areas 20 and 22 is any suitable cohesive, as is available from a variety of commercial sources.

Figure 4:
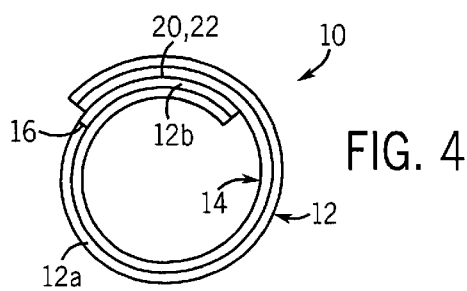
FIG. 4 is a view of the label of FIGS. 1–3 wrapped and with its ends secured to one another.

When the cohesive areas 20 and 22 are brought together by wrapping the wrap as shown in FIG. 4, they stick together to keep the wrap 10 closed until they are peeled apart or the label is torn open by the user.

Figure 5:
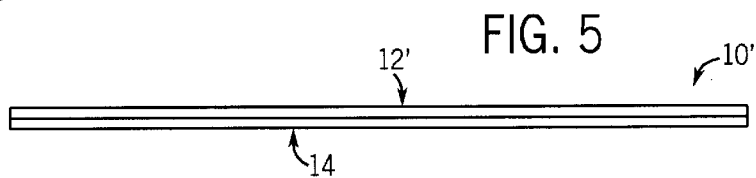
FIG. 5 is a view similar to FIG. 2 but of a modification to the label.

FIG. 5 illustrates a modification to the wrap of FIGS. 1–3 identified by 10'. The wrap 10' is the same as the wrap 10, except that the top sheet 12' is not slit and so does not include the slit line 16. In all other respects, the wrap 10' is identical.

In the embodiment disclosed, the top 12 and bottom 14 plies were 60 pound (basis weight) paper, with their upper surfaces coated so as to be semi-gloss. The invention is not limited to the use of paper, the use of any sheet or film material, paper, plastic, metal or other material being possible. Inks used for printing were standard water based inks. After printing, the top surface of the top ply 12 is coated with a suitable FDA accepted water based varnish.

The two plies are dry release bonded by any suitable method. In the disclosed embodiment, in preparation for bonding, the upper surface of the bottom sheet was first coated with a suitable varnish to seal its surface. Following curing of the varnish, the top surface of the base sheet 14 was coated with a suitable release agent. Following curing of the release agent, a suitable water base adhesive is used to bond the two sheets together.

With the embodiment 10, if a user lifted the top left hand corner 28 of the top sheet 10 while the wrap was still wrapped around the napkin, ice cream cone or other item, just the part 12a would be removed from the remainder of the wrap 10 and the wrap 10 would remain wrapped around the item. Subsequently, to unwrap the wrap, the user would either separate the bottom sheet 14 from the part 12b by breaking the cohesive bond between the areas 20 and 22, or alternatively could break the bond between the lower side of part 12b and the upper side of layer 14 by breaking the dry residue adhesive bond 18. Either way, the wrap 10 becomes unwrapped to release the napkin, ice cream cone or other item.

As a modification to the wrap 10, the dry release adhesive under the part 12b could be replaced with a permanent adhesive, so that the part 12b would not be removable from the base sheet 14. The adhesive under the part 12a would remain a releasable adhesive so that the part 12a could still be removed from the base sheet 14. With such a construction, the wrap 10 would be unwrapped by breaking the cohesive bond between the areas 20 and 22.

With the embodiment of FIG. 5, it is intended that the cohesive bond between the areas 20 and 22 would first be broken, thereby unwrapping the wrap 10', and then the one piece top sheet 12' would be removed from the base sheet 14. However, with the embodiment 10', if the top sheet 12' is peeled from the base sheet 14, breaking the bond of the adhesive 18 while the wrap 10' is still wrapped around the napkin, ice cream cone or other item, the result is that the wrap 10' releases the item and stays in one piece, with the cohesive areas 20 and 22 remaining bound to one another to yield a strip in which all surfaces of it are legible, except the relatively small areas confronting the cohesive areas 20 and 22. The resulting strip is almost twice as long as the original strip, being not exactly twice as long since the areas 20 and 22 overlap.

Thus, a label wrap of the invention provides promotional opportunities to a restauranteur or other user by providing direct communication to the customer when the customer is confronted by the wrap and unwraps and reads it.

Many modifications and variations to the preferred embodiments described will be apparent to those skilled in the art. Therefore, the invention should not be limited to the embodiments described.

We claim:

1. A label wrap which is a strip of material having a first side and a second side opposite from the first side, and a first end and a second end opposite from the first end, said strip comprising first and second sheets each having an outward facing side and an inward facing side, wherein the inward facing sides of the first and second sheets are releasably joined by an adhesive, and wherein a first area of cohesive is applied to said first side adjacent to said first end of said strip and a second area of cohesive is applied to said second side adjacent said second end of said strip, so that the first and second areas of cohesive can be joined to form a closed path, wherein at least one of the inward and outward facing surfaces of at least one of said first and second sheets bears printed indicia and wherein the adhesive between the first and second sheets is a dry residue adhesive.

2. The label wrap of claim 1, wherein one of the areas of cohesive is on the first sheet and the other area of cohesive is on the second sheet.

3. The label wrap of claim 1, wherein the second sheet includes first and second parts.

4. The label wrap of claim 3, wherein the first sheet is provided in a single integral sheet.

5. The label wrap of claim 4, wherein the inward facing surfaces of the first and second parts are releasably adhered to the first sheet.

6. The label wrap of claim 5, wherein the first part is not adhered to the first sheet at one corner.

7. The label wrap of claim 4, wherein the second part includes one of the cohesive areas at its outward facing surface and is permanently adhered to the first sheet.

8. The label wrap of claim 7, wherein the first part is not adhered to the first sheet at one corner.

9. The label wrap of claim 1, wherein the first and second sheets are not adhered together at one corner.

* * * * *